(No Model.)

C. H. MADSEN.
COFFEE ROASTER.

No. 375,641.  Patented Dec. 27, 1887.

WITNESSES
F. L. Ourand
Edward Stanton

Carl Henrik Madsen,
INVENTOR
By Louis Bagger & Co.
Attorneys.

UNITED STATES PATENT OFFICE.

CARL HENRIK MADSEN, OF COPENHAGEN, DENMARK.

COFFEE-ROASTER.

SPECIFICATION forming part of Letters Patent No. 375,641, dated December 27, 1887.

Application filed June 2, 1886. Serial No. 203,933. (No model.)

*To all whom it may concern:*

Be it known that I, CARL HENRIK MADSEN, of Copenhagen, in the Kingdom of Denmark, have invented certain new and useful Improvements in Apparatus for and Processes of Treating Coffee; and I do hereby declare that the following is a full, clear, and exact description of the invention, which will enable others skilled in the art to which it appertains to make and use the same, reference being had to the accompanying drawings, which form a part of this specification, and in which—

Figure 1:
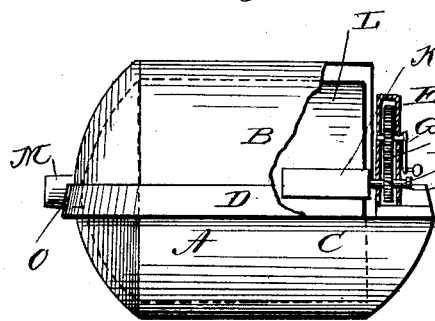
Figure 2:
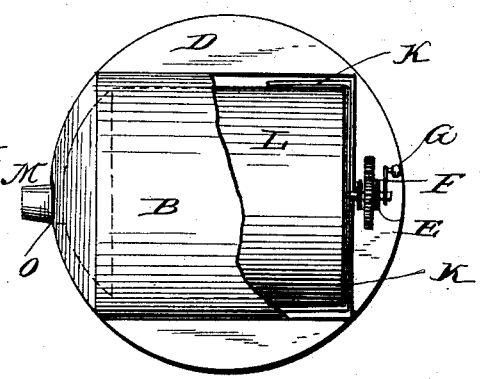
Figure 3:
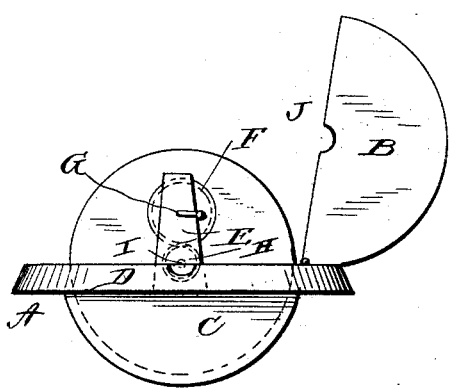
Figure 4:
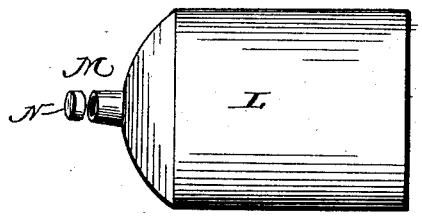

Figure 1 is a side view of the roaster which I prefer to use in my improved method for treating coffee-beans. Fig. 2 is a top view of the same. Fig. 3 is an end view showing the outer jacket opened, and Fig. 4 is a view of the inner vessel.

Similar letters of reference indicate corresponding parts in all the figures.

My invention has relation to an improved apparatus for and process of treating coffee; and it consists in the process of first grinding the coffee-beans, and thereupon roasting them and retaining the roasted coffee-meal in the vessel in which it is roasted, as hereinafter more fully described and claimed.

In the accompanying drawings the letter A indicates a cylindrical jacket having its upper half, B, hinged to the lower half, and this lower half, C, is provided with a circular flange, D, with which it may be supported over a fire-aperture in a stove or range. The circular flange is provided at the forward end of the cylindrical jacket with an upright frame, E, in which a train of gear-wheels, F, are journaled, one of the said wheels having a crank, G, upon its shaft, and one, H, of the gear-wheels is secured upon a shaft, I, which is concentric with the cylindrical jacket and projects into the same with its inner end through an aperture formed by semicircular notches J in the edges of the end pieces of the jacket-halves, having a clamp, K, at its inner end, with which it may clamp and hold a cylindrical receiver, L, which contains the ground coffee to be roasted. The rear end of this receiver is provided with a neck or trunnion, M, provided with a suitable cap, N, closing it, and this neck or trunnion, through which the contents of the receiver may be filled into it and emptied out of it, is journaled in a suitable bearing, O, at the rear end of the cylindrical jacket.

When the coffee is to be prepared, the beans are first ground in any suitable mill or grinder, and the coffee-meal is thereupon filled into the receiver, which is placed in the cylindrical jacket and revolved over a fire, the receiver being closed, so that none of the volatile oils in the coffee can escape. When the coffee is sufficiently roasted, the receiver is removed from the jacket, and the ground and roasted coffee is retained in the receiver, from which it may be emptied as it is consumed.

It will be seen that the drawbacks which have attended the process of treating coffee usually followed—viz., first roasting the coffee and thereupon grinding it—and which drawbacks have been the imperfect roasting of the entire beans and the escaping of the volatile oils in the roasted coffee during grinding, will be entirely overcome, the ground coffee being easily and perfectly roasted, and the volatile oils, which give the aroma to the coffee, will not escape during the grinding of the coffee-beans, as the beans are raw when ground, and consequently will not have the said oils developed into such a shape that they will evaporate as easily as in the roasted coffee.

By keeping the ground and roasted coffee in the receiver in which it was roasted none of the aroma will escape in filling the coffee from the roaster into a receiver, and in this manner the coffee treated by the herein-described process will retain as much of its aroma as is possible.

Having thus described my invention, I claim and desire to secure by Letters Patent of the United States—

In a coffee-roaster, the combination of a cylindrical jacket, the lower half of which is provided with a circular flange having a bearing at one side, a train of gear-wheels secured to the opposite side, one of said wheels being provided with a shaft which projects into the jacket, a clamp rigidly secured to the inner end of said shaft, and a receiver having a neck or trunnion and a cap.

In testimony that I claim the foregoing as my own I have hereunto affixed my signature in presence of two witnesses.

CARL HENRIK MADSEN.

Witnesses:
VIGGO C. EBERTH,
LAURITZ NIELSEN.